2,788,360
PREPARATION OF DICYANO HALO-ETHANE CYCLIC COMPOUNDS

Jerome C. Westfahl, Cuyahoga Falls, Ohio, assignor to The B. F. Goodrich Company, New York, N. Y., a corporation of New York No Drawing. Application May 28, 1954, Serial No. 433,304

5 Claims. (Cl. 260—465)

This invention relates to a novel method for the preparation of cyclic compounds having a 1,1-dicyano-1-haloethane group directly attached to a ring carbon atom, and relates particularly to a method of preparing aromatic and heterocyclic compounds having a 1,1-dicyano-1-haloethane group attached directly to a ring carbon atom.

Disclosed in United States Patent application 380,123 and 380,124 filed September 14, 1953, by J. C. Westfahl, are methods for the preparation of aromatic and heterocyclic methylene malononitriles. These aromatic and heterocyclic methylene malononitriles are water-insoluble and readily susceptible to hydrolysis or hydration in alkaline solutions.

According to the method of this invention, aromatic and heterocyclic methylene malononitriles are reacted with hypohalous acids, salts or esters thereof in an alkaline media to obtain aromatic and heterocyclic compounds having a 1,1-dicyano-1-halo-ethane group attached directly to a ring carbon atom.

The reaction of aromatic and hetercyclic methylene malononitriles with a hypohalite compound which is soluble in an aqueous alkaline media can be described generically as follows:

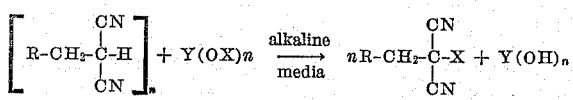

wherein R represents an aromatic or heterocyclic group; X represents bromine or chlorine; Y represents hydrogen, an alkali or alkaline earth metal or an alkyl hydrocarbon group; and $n$ is an integer equal to the valence of Y.

The practice of this invention can be carried out by adding a hypohalous acid, alkali or alkaline earth metal salts of a hypohalous acid, or any alkyl ester of a hypohalous acid to an alkaline solution containing the desired aromatic or heterocyclic methylene malononitrile reactant.

Included, by way of example, within the term aromatic and heterocyclic methylene malononitriles which can be employed in carrying out the reactions of this invention are the following compounds:

Benzyl malononitrile; o,m and p-methyl benzyl malononitrile; 2,4-dimethyl benzyl malononitrile; 2,4,6-trimethyl benzylmalononitrile; 2,5-dimethylbenzylmalononitrile; 2-naphthylmethylmalononitrile; 2 - thenylmalononitrile; para - methoxybenzylmalononitrile; 2,5 - dimethoxy - benzylmalononitrile; 2 - methoxy - 5 - chlorobenzyl - malononitrile; para - hydroxybenzylmalononitrile; 1,3,5 - trimethyl - 2,4 - bis(2,2 - dicyanoethyl) benzene; 1,4-dimethoxy - 2,5 - bis(2,2 - dicyanoethyl) benzene; 2-(2,2-dicyanoethyl) furan; p,p - di(2,2-dicyanoethyl) di - benzyl; 1 - methylenecarboxy - 3 - hydroxy - 4 - (2,2 - dicyanoethyl) benezene; 1 - dimethylenecarboxy - 4 - (2,2 - dicyanoethyl) benzene; 4 - (2,2 - dicyanoethyl) bibenzyl; 3(2,2 - dicyanoethyl) - 4 - methyl - phenylnitromethane; p - ethyl - m - (2,2 - dicyanoethyl) phenyl acetonitrile; p - (2,2 - dicyanoethyl) benzyl acetate; 3 - (2,2 - dicyanoethyl) - 4 - ethoxy phenyl methane - sulfonic acid; 4-[p-(2,2-dicyanoethyl) phenyl]-3-butenoic acid and 4-[4-(2,2-dicyanoethyl) naphthyl]-3-butenoic acid and the like.

Among the hypohalous acids, alkali and alkaline earth metal salts of hypohalous acids, and alkyl esters of hypohalous acids are included, by way of example, the following compounds:

Hypochlorous acid, hypobromous acid, sodium hypochlorite, sodium hypobromite, calcium hypochlorite, calcium hypobromite, potassium hypochlorite, methyl hypochlorite, ethyl hypobromite, propyl hypochlorite, propyl hypobromite, butyl hypochlorite, butyl hypobromite and the like.

The proportions of hypohalous acid and aromatic or heterocyclic methylene malononitrile can be varied widely in the practice of this invention, although it is desirable that molar equivalents of the cyclic methylene malononitrile and hypohalite or a slight molar excess of hypohalite be employed.

The temperature at which the reactions of this invention can be carried out can be varied over a wide range, but preferably the reaction should be carried out at temperatures of about 20° C. to —20° C. in order to avoid decomposition of the hypohalite compounds since said compounds decompose in basic solutions at elevated temperatures.

In carrying out the reactions of this invention it is very desirable that the hypohalite compounds be brought in contact with the dissolved or alkaline solutions of the cyclic methylene malononitriles within a short period of time after the cyclic methylene malononitrile has been added to the aqueous alkaline solution, since as is pointed out hereinbefore, the nitrile groups of the malononitriles are readily susceptible to hydrolysis.

The following examples are illustrative of the method of carrying out the reactions of this invention, and although they are specific in reference to the operating conditions, it is not intended that the patent should be limited thereto, for of course there are numerous means which are equivalent, which will be apparent to one skilled in the art. In all of the following examples all parts are by weight unless otherwise specified.

EXAMPE I 262 parts (0.185 mol) of a 5.25% aqueous solution of sodium hypochlorite was charged in a 1-liter 3-neck glass flask fitted with a thermometer and a stirred. A mixture of 10 parts sodium hydroxide, 100 parts of water and 20 parts of 2,5-dimethoxy benzyl malononitrile was warmed until the solid dinitrile was essentially dissolved. The flask containing the sodium hypochlorite solution was cooled to —7° C. and the nitrile in solution in the sodium hydroxide was poured rapidly with stirring into the reaction flask. The reaction went to completion in about 2 minutes. The reaction products were diluted with water, and the mixture was filtered with suction. A light yellow solid was recovered, washed with cold water, dried in vacuo to yield 20.04 parts (85.1%) of crude 2,5-dimethyoxybenzylchloromalononitrile having the following structural formula

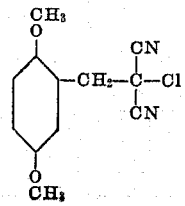

and having a melting point of 51.5 to 52.5° C. The product was analyzed for carbon, hydrogen, nitrogen and chlorine content, and the analysis follows:

|                  | Theory | Found       |
|------------------|--------|-------------|
| Percent Carbon   | 57.49  | 57.40, 57.36|
| Percent Hydrogen | 4.42   | 4.43, 4.44  |
| Percent Nitrogen | 11.18  | 11.20       |
| Percent Chlorine | 14.14  | 13.67       |

EXAMPLE II

A 3-neck glass flask fitted with a thermometer, a glass stirring rod, and a dropping funnel was charged with 16.15 parts of sodium hydroxide and 190 parts of water. The flask was cooled below 5° C. and 21.5 parts (0.135 mol) of bromine was added dropwise at a rate such that the temperature remained below 5° C. A mixture comprising 210 parts of water and 21 parts of sodium hydroxide was added to 21 parts (0.1345 mol) of benzylmalononitrile. The mixture was stirred and when the solid benzylmalononitrile was almost completely dissolved the solution was added through the funnel to the sodium hypobromite solution over an interval of about 3 minutes. The reaction product, a slurry of yellow solid, was diluted with equal volume of cold water and filtered with suction. The solid was washed with cold water, dried in vacuum, purified by recrystallization from hexane and 15.8 parts (50%) of benzylbromomalononitrile was recovered. The product was analyzed for melting point, carbon, hydrogen, nitrogen and bromine, and the analysis is as follows:

|                  | Theory | Found        |
|------------------|--------|--------------|
| Percent Carbon   | 51.08  | 51.26, 51.24 |
| Percent Hydrogen | 3.00   | 3.00, 2.93   |
| Percent Nitrogen | 11.92  | 11.92        |
| Percent Bromine  | 34.00  | 34.21, 34.13 |
| Melting Point    |        | 119.5–120.5  |

EXAMPLES III TO VI

The following compounds were prepared in accordance with the methods disclosed in Example I: benzylchloromalononitrile; 2,4,6-trimethylbenzylchloromalononitrile; 2,4,6-trimethylbenzylbromomalononitrile; 4-methoxybenzylbromomalononitrile. Determination of melting points and carbon, hydrogen, nitrogen and halogen content was carried out and is set out in the following table:

III. *Benzylchloromalononitrile*

|                  | Theory | Found        |
|------------------|--------|--------------|
| Percent Carbon   | 63.00  | 63.14, 63.09 |
| Percent Hydrogen | 3.70   | 3.77, 3.80   |
| Percent Nitrogen | 14.70  | 14.61        |
| Percent Chlorine | 18.60  | 18.66, 18.61 |
| Melting Point, °C|        | 90–91        |

IV. *2,4,6-trimethylbenzylchloromalononitrile*

|                  | Theory | Found        |
|------------------|--------|--------------|
| Percent Carbon   | 67.09  | 67.07, 67.08 |
| Percent Hydrogen | 5.63   | 5.63, 5.54   |
| Percent Nitrogen | 12.04  | 12.07        |
| Percent Chlorine | 15.24  | 15.18        |
| Melting Point    |        | 66.3–67.3    |

V. *2,4,6-trimethylbenzylbromomalononitrile*

|                  | Theory | Found        |
|------------------|--------|--------------|
| Percent Carbon   | 56.33  | 56.47, 56.39 |
| Percent Hydrogen | 4.72   | 4.75, 4.60   |
| Percent Nitrogen | 10.11  | 10.00        |
| Percent Bromine  | 28.82  | 29.03, 28.92 |
| Melting Point    |        | 95.5–96.5    |

VI. *4-methoxybenzylbromomalononitrile*

|                  | Theory | Found        |
|------------------|--------|--------------|
| Percent Carbon   | 49.83  | 49.92, 50.09 |
| Percent Hydrogen | 3.42   | 3.39, 3.42   |
| Percent Nitrogen | 10.57  | 10.62        |
| Percent Bromine  | 30.15  | 30.29, 30.56 |
| Melting Point    |        | 59.5–60.5    |

EXAMPLES VII AND VIII

Reaction of heterocyclic methylenemalononitriles with hypochlorite compounds according to the method described in Example I gives in good yields heterocyclic compounds having a 1,1-dicyano-1-chloroethane group attached directly to a ring carbon atom. Set out in the following table are heterocyclic methylene malononitrile compounds which react with hypochlorite compounds and the products obtained thereby.

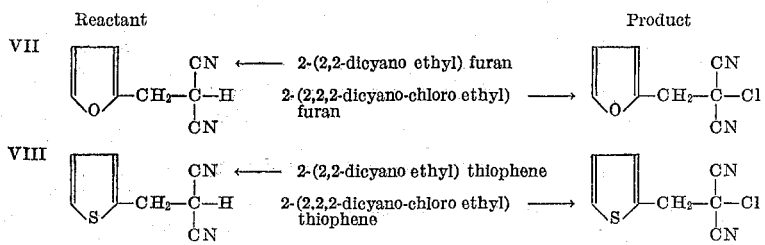

VII Reactant: furan-CH₂-C(CN)₂-H ← 2-(2,2-dicyano ethyl) furan; 2-(2,2-dicyano-chloro ethyl) furan → Product: furan-CH₂-C(CN)(Cl)-CN VIII Reactant: thiophene-CH₂-C(CN)₂-H ← 2-(2,2-dicyano ethyl) thiophene; 2-(2,2-dicyano-chloro ethyl) thiophene → Product: thiophene-CH₂-C(CN)(Cl)-CN The reaction of heterocyclic methylene malononitriles of Examples VII and VIII with hypobromites, in accordance with the method of Example I will produce bromo-compounds corresponding to the products obtained in Examples VII and VIII. The reaction of aromatic and heterocyclic methylene malononitriles with low molecular weight alkyl hypohalites, such as methyl hypochlorite, in accordance with the procedures described hereinbefore, produces in good yield aromatic and heterocyclic compounds having a 1,1-dicyano-1-halo-ethane group attached to a ring carbon atom.

The methods employed in carrying out the reactions of this invention are efficient for preparing cyclic compounds having a 1,1-dicyano-1-halo-ethane group attached directly to a ring carbon atom wherein the halogen is characterized by acting as a positive halogen. These compounds are readily hydrolysed in aqueous solution and can be employed in solution as bactericidal formulations.

From the foregoing it is readily apparent that the novel cyclic 1,1-dicyano-1-halo-ethane compounds of this invention can be prepared with little difficulty. Various modifications and deviations from the methods disclosed herein will be readily apparent to those skilled in the art; therefore it is not intended that the invention be limited solely thereto, but only in accordance with the appended claims.

I claim:

1. The method which comprises reacting a compound having the formula R—CH₂—CH(CN)₂ in which R is selected from the class consisting of monocyclic and bicyclic aromatic rings, furan and thiophene rings, with a water-soluble alkaline hypohalite in which the halogen is selected from the class consisting of chlorine and bromine to form a compound having the formula R—CH₂—CX(CN)₂ wherein R has the same designation as above and X is selected from the class consisting of chlorine and bromine.

2. The method which comprises reacting a compound having the formula R—CH$_2$—CH(CN)$_2$ in which R is selected from the class consisting of monocyclic and bicyclic aromatic rings and furan and thiophene rings with a hypohalite in an aqueous alkaline solution to form a compound having the formula R—CH$_2$—CX(CN)$_2$ wherein R has the same designation as above and X is selected from the class consisting of chlorine and bromine.

3. The method which comprises reacting a compound having the formula R—CH$_2$—CH(CN)$_2$ in which R is selected from the class consisting of monocyclic and bicyclic aromatic rings and furan and thiophene rings with a hypobromite in an aqueous alkaline solution to form aromatic and heterocyclic compounds having the formula R—CH$_2$—CX(CN)$_2$ wherein R has the same designation as above and X is bromine.

4. The method which comprises reacting a compound having the formula R—CH$_2$—CH(CN)$_2$ in which R is selected from the class consisting of monocyclic and bicyclic aromatic rings and furan and thiophene rings with a hypochlorite in an alkaline solution to form aromatic and heterocyclic compounds having a

—CH$_2$—CX(CN)$_2$ group attached to a ring carbon atom wherein X is chlorine.

5. The method which comprises reacting benzylmalononitrile with hypochlorous acid in an alkaline solution to form benzylchloromalononitrile.

References Cited in the file of this patent
UNITED STATES PATENTS 2,602,090   Dosser et al. _____ July 1, 1952

OTHER REFERENCES

Clark: 26 Chem. Abst., page 1561 (1932).
Leulier et al.: 34 Chem. Abst., col. 78 (1940).
Hopkins et al.: 41 Chem. Abst., col. 734 (1947).
Derbyshire et al.: 45 Chem. Abst., col. 9495 (1951).